(No Model.) 2 Sheets—Sheet 1.

O. & W. THUM.
STICKY FLY PAPER.

No. 520,715. Patented May 29, 1894.

Attest
Walter Donaldson
F. L. Middleton

Inventors
Otto Thum
William Thum
by Ellis Spear
Atty.

(No Model.) 2 Sheets—Sheet 2.
O. & W. THUM.
STICKY FLY PAPER.
No. 520,715. Patented May 29, 1894.
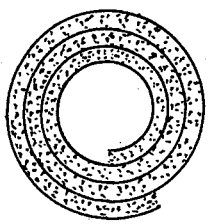
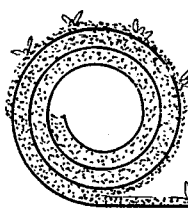
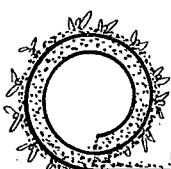
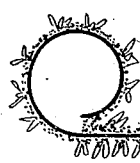
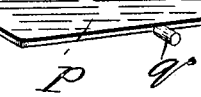
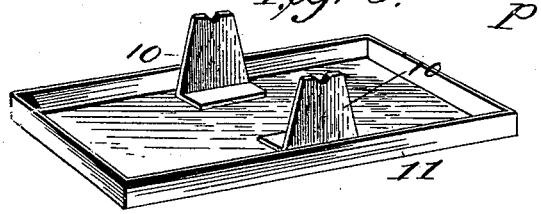
Attest
Walter Donaldson
F. L. Middleton
Inventors
Otto Thum
William Thum
by Ellis Spear
Atty.
THE NATIONAL LITHOGRAPHING COMPANY,
WASHINGTON, D. C.

UNITED STATES PATENT OFFICE.

OTTO THUM AND WILLIAM THUM, OF GRAND RAPIDS, MICHIGAN.

STICKY FLY-PAPER.

SPECIFICATION forming part of Letters Patent No. 520,715, dated May 29, 1894.

Application filed October 22, 1892. Serial No. 449,593. (No specimens.)

*To all whom it may concern:*

Be it known that we, OTTO THUM and WILLIAM THUM, citizens of the United States of America, residing at Grand Rapids, in the county of Kent and State of Michigan, have invented certain new and useful Improvements in Fly-Paper, of which the following is a specification.

Our invention relates to sticky fly paper in the form of a pack or book.

A form of pack or book of sticky fly paper is shown in an application filed by us, in the United States Patent Office, on May 14, 1891, having the Serial No. 392,687, composed of a series of sheets coated on both sides, excepting those on the outside of the pack, but in our present invention while the same principle is involved we vary the form, making the paper of a continuous sheet, and we have also combined it with a support, upon which the pack may be held and turned, all as hereinafter explained.

Our invention is illustrated in the accompanying drawings, in which—

Figure 1:
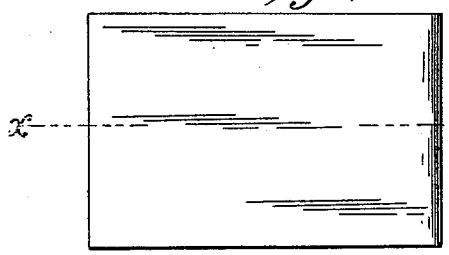
Figure 2:
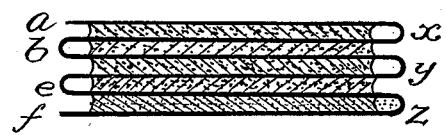
Figure 3:
Figure 4:
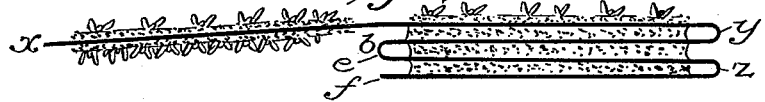
Figure 5:
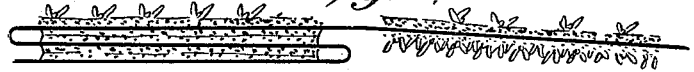
Figure 6:
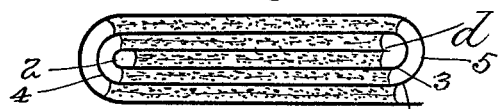
Figure 7:
Figure 8:
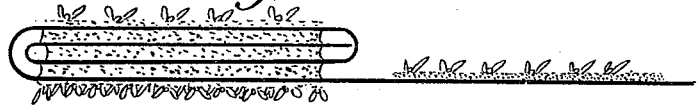
Figure 9:
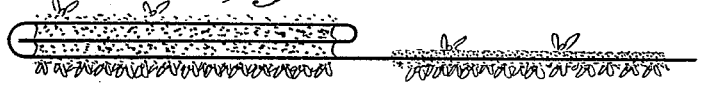

Figure 1 represents our improved pack in plan view. Fig. 2 shows a section on line $x$—$x$ of Fig. 1. Figs. 3, 4 and 5 show similar sections illustrating the method of use of this pack. Fig. 6 shows a similar section of a pack folded in a different manner from Figs. 2 to 5. Figs. 7, 8 and 9 represent the method of using this form of pack. Fig. 10 shows a section of the pack rolled. Figs. 11, 12 and 13 show the method of using the pack shown in Fig. 10. Fig. 14 is a section of the pack of Fig. 6, with a support. Fig. 15 is a detached view of the support. Fig. 16 is a perspective view of the box in which the paper is transported or stored, arranged to form a frame or stand for it when in use.

The general principle of construction which distinguishes the packs shown in the illustrations above referred to, is the formation by the folding or winding of a continuous sheet or web of paper, with the catching or as it is commonly called, the "sticky" material properly placed upon the web as or before it is wound or folded into the pack.

The web of paper is cut or formed preferably of the width of the ordinary sticky fly paper, and as shown in Fig. 2, it is folded back and forth, beginning for example with the part $f$—$z$, which is approximately the length required for the pack, and for convenience in handling, it may be as long as an ordinary package of fly paper. The lower or outer side of the part $f$—$z$ is not coated with the sticky material. The fold is at $z$, and that part of the web between $z$ and $e$ is folded down upon the part $f$—$z$. It is folded again at $e$, and then turned back to $y$, where another fold occurs and the web is reversed, and so on to the completion of the pack, the web being laid back and forth with even lengths, and bends or folds at the ends.

It is not necessary that the web be covered continuously, or on both sides, with the sticky material. Regularly occurring spaces are left across the web, which may be uncoated on one or both sides where the bends, as $x$, $y$ and $z$ occur. The rest of the web may have both sides covered with the sticky material, where the over and underlying faces meet, or only one meeting face may be coated, receiving enough to yield a part to the over or underlying face, when these are in contact. For example, double the amount usually required of the sticky substance may be placed upon the lower part between $f$ and $z$, and the under side of the part $z$—$e$ may be left uncoated as it will take up enough from the surface below, with which it is in contact. Then the upper side of the part $e$—$z$ is likewise coated with a double quantity, and so on. But both sides may be coated with an equal amount. The last sheet space, between $x$ and $a$ is uncoated on the outside, so that the package may be handled, and none of the coated surfaces are exposed.

Fig. 3 shows how this pack is used. The upper folded part $a$—$x$ is opened and turned back to the position shown, in which the uncoated side is down, and a double extent of coated surface exposed from $a$ to $x$ and $x$ to $b$. When these exposed parts have been sufficiently used, the folded part $a$—$x$ is cut off and removed, and the part $x$—$b$ next below is opened and turned to the left as shown in Fig. 4, its under surface being usually so covered with flies as to prevent smearing, but it may be allowed to rest on a piece of ordinary paper. The second part may then be cut off and the third part unfolded from $b—y$ and turned back as shown in Fig. 5, and the use so continued through the whole series of surfaces. In Fig. 6, the same general feature of folding is included, but instead of being folded back and forth, the web is rolled. Beginning at $d$, the interior termination of the web, it is folded around at 2, 3, 4 and 5. The outside end of the web, to the point 6 is left uncoated and thus the whole exterior of the completed roll is free from the sticky material.

Fig. 7 shows how the parts are exposed in use, the roll or pack being turned over to the left, leaving two exposed surfaces as before, one being the uncovered upper surface of the pack, the upper surface of Fig. 5 being underneath in Fig. 7. When this has been exhausted, the extended part of Fig. 7 is cut off, and the pack turned over again to the left, leaving it as shown in Fig. 8, and a third turn to the left, after cutting off the extended end, leaves the pack as shown in Fig. 9. Paper may be placed under the sticky part in this case also, when the sticky surfaces are turned down, but when the sticky surfaces are covered or partially covered with flies, and partially dried by exposure, they do not adhere unless heavily pressed.

Fig. 10 shows the pack in the form of a cylindrical roll; in this all the surfaces are covered, excepting the outside of the end, enough to cover the cylinder. It is unrolled in use as shown in Figs. 11, 12 and 13, parts being cut off as used. In this case the folding is continuous in one direction, and in this also, as in the other forms, the sticky material is between the contiguous faces, and adheres to both. It will be understood that the margins of the web, alongside the coated surfaces, or all around the surfaces may be supplied with a confining border or dam of any suitable material to prevent outflow of the sticky substance.

In Fig. 14 we have shown a support consisting of a plate $p$, of wood or equivalent material, fitted to the pack and folded therein. It has pintles $q—q$ which are fitted to bearings in any suitable support or frame and instead of the two pintles four may be used one at each corner or other means of support provided. We find it convenient to utilize the box in which the paper is transported or stored as a stand or frame and provide it as shown in Fig. 16 with two uprights $r—r$, folded against the bottom when not in use, but adapted to receive the pintles when raised to a vertical position. The box thus protects the underlying surface also.

We claim—

A pack of sticky fly paper formed of a web folded upon itself, with the sticky material interposed between the contiguous faces, and with the outer exposed surfaces uncoated, substantially as described.

In testimony whereof we affix our signatures in presence of two witnesses.

OTTO THUM.
WILLIAM THUM.

Witnesses:
FREDERICK LOETTGERT,
FERDINAND THUM.